United States Patent
Gally et al.

(10) Patent No.: US 10,138,811 B2
(45) Date of Patent: Nov. 27, 2018

(54) ENHANCED TEMPERATURE CONTROL ANTI-ICE NOZZLE

(71) Applicant: The Boeing Company, Chicago, IL (US)

(72) Inventors: Daniel H. Gally, Seattle, WA (US); Joseph J. Seydel, Mount Prospect, IL (US); Nyi Nyi, Newcastle, WA (US); Tristan Wit, Seattle, WA (US); Joseph G. Davidson, Renton, WA (US)

(73) Assignee: The Boeing Company, Chicago, IL (US)

( * ) Notice: Subject to any disclaimer, the term of this patent is extended or adjusted under 35 U.S.C. 154(b) by 591 days.

(21) Appl. No.: 14/209,434

(22) Filed: Mar. 13, 2014

(65) Prior Publication Data

US 2015/0260099 A1    Sep. 17, 2015

(51) Int. Cl.
*F02C 7/047* (2006.01)
*B64D 15/04* (2006.01)
(Continued)

(52) U.S. Cl.
CPC .............. *F02C 7/047* (2013.01); *B05B 1/005* (2013.01); *B64D 15/04* (2013.01);
(Continued)

(58) Field of Classification Search
CPC .... F02C 7/047; F02C 6/08; B64D 2033/0233; B64D 15/04; B64D 2033/0226;
(Continued)

(56) References Cited

U.S. PATENT DOCUMENTS

| 1,827,276 A | * | 10/1931 | Alfaro | B64D 15/04 244/134 B |
| 2,519,531 A | * | 8/1950 | Worn | F02C 3/32 417/158 |

(Continued)

FOREIGN PATENT DOCUMENTS

| CN | 101952573 A | 1/2011 |
| EP | 1186533 A1 | 3/2002 |

(Continued)

OTHER PUBLICATIONS

"European Application Serial No. 15158941.3, Search Report dated Aug. 14, 2015", 7 pgs.

(Continued)

*Primary Examiner* — Gerald L Sung
*Assistant Examiner* — Alain Chau
(74) *Attorney, Agent, or Firm* — Kwan & Olynick LLP

(57) ABSTRACT

Systems, methods, and apparatus are disclosed for preventing formation of ice on an engine. Apparatus may include a nozzle housing coupled to a compression stage of the engine and further coupled to a leading edge housing of the engine. The nozzle housing may receive gases from the compression stage of the engine. The nozzle housing may include a first nozzle that may be configured to generate a first flow pattern and may be further configured to generate a first flow of a first portion of the gases into the leading edge housing based on the first flow pattern. The nozzle housing may also include a second nozzle that includes a concentric nozzle configured to generate a second flow pattern. The second nozzle may be configured to generate a second flow of a second portion of the gases into the leading edge housing based on the second flow pattern.

20 Claims, 9 Drawing Sheets

(51) Int. Cl.
  *B64D 33/02* (2006.01)
  *B05B 1/00* (2006.01)
  *F02C 6/08* (2006.01)
  *F01D 25/24* (2006.01)
(52) U.S. Cl.
  CPC ...... *B64D 2033/0233* (2013.01); *F01D 25/24* (2013.01); *F02C 6/08* (2013.01); *F05D 2240/14* (2013.01)
(58) Field of Classification Search
  CPC ............ B64D 2033/0286; B64D 15/00; B64D 15/02; B64D 33/02; F01D 25/24; F05B 2240/14; F05B 2260/208
  See application file for complete search history.

(56) References Cited

U.S. PATENT DOCUMENTS

| | | | | |
|---|---|---|---|---|
| 3,749,336 A * | 7/1973 | Christensen | ........... | B64D 15/02 244/134 B |
| 4,474,259 A * | 10/1984 | Wright | ............... | F02K 1/46 181/213 |
| 4,674,714 A * | 6/1987 | Cole | ............... | B64D 15/04 138/104 |
| 4,688,745 A | 8/1987 | Rosenthal | | |
| 4,757,963 A * | 7/1988 | Cole | ............... | B64D 15/04 244/134 B |
| 5,088,277 A * | 2/1992 | Schulze | ............... | B64D 15/04 244/134 R |
| 6,131,855 A * | 10/2000 | Porte | ............... | B64D 15/04 244/134 B |
| 6,193,192 B1 * | 2/2001 | Porte | ............... | F16L 27/125 244/134 B |
| 6,241,189 B1 * | 6/2001 | Porte | ............... | B64D 15/04 244/134 B |
| 6,267,328 B1 | 7/2001 | Vest | | |
| 6,354,538 B1 * | 3/2002 | Chilukuri | ............... | B64D 15/04 244/134 B |
| 6,443,395 B1 * | 9/2002 | Porte | ............... | B64D 15/04 244/134 R |
| 7,909,261 B2 * | 3/2011 | Ellstrom | ............... | B64D 15/04 236/12.11 |
| 8,061,657 B2 | 11/2011 | Rocklin et al. | | |
| 2002/0148929 A1 | 10/2002 | Andre et al. | | |
| 2009/0090814 A1 | 4/2009 | Barbara et al. | | |
| 2011/0011981 A1 * | 1/2011 | Vauchel | ............... | B64D 33/02 244/134 B |
| 2011/0162386 A1 * | 7/2011 | Chandrabose | ............ | F02C 3/32 60/785 |
| 2012/0248249 A1 | 10/2012 | Hormiere et al. | | |
| 2012/0248250 A1 | 10/2012 | Porte et al. | | |
| 2014/0060166 A1 * | 3/2014 | Meis | ............... | B64D 15/04 73/118.03 |

FOREIGN PATENT DOCUMENTS

| | | |
|---|---|---|
| EP | 2851299 A1 | 3/2015 |
| JP | H06221184 A | 8/1994 |

OTHER PUBLICATIONS

"Chinese Application Serial No. 2015101124966, Office Action dated Jun. 26, 2017", 14 pgs.

"Japanese Application Serial No. 2014-262197, Office Action dated Aug. 27, 2018", 8 pgs.

* cited by examiner

ENHANCED TEMPERATURE CONTROL ANTI-ICE NOZZLE

TECHNICAL FIELD

This disclosure generally relates to vehicles and machinery and, more specifically, to anti-ice nozzles that may be used with such vehicles and machinery.

BACKGROUND

In operation, an engine nacelle may experience conditions in which icing may occur. For example, an engine nacelle of an aircraft, as well as other parts of the aircraft, may experience the formation of ice when operating in cold or below-freezing temperatures. The formation of such ice may dramatically alter one or more flight characteristics of the aircraft. For example, the formation of ice may deleteriously affect the aerodynamics of the aircraft, add additional undesirable weight, as well as generate a hazard when such ice breaks off and potentially strikes another portion of the aircraft. Conventional techniques for removing ice that has formed on an engine nacelle remain limited and do not efficiently and effectively remove such ice.

SUMMARY

Provided are systems, methods, and apparatus for preventing formation of ice on the leading edge of an engine nacelle. In various embodiments, a nozzle housing may receive gases, which may be heated, from one or more components of the engine nacelle and provide the gases to an internal volume of a leading edge housing mounted on the leading edge of the engine nacelle. The nozzle housing may include a first nozzle and a second nozzle, where the second nozzle is a concentric nozzle. The first nozzle and the second nozzle may be configured to cause the gases to circulate within the internal volume of the leading edge housing to heat the leading edge housing in a substantially uniform fashion. In this way, a temperature of a hot spot and a temperature of a cold spot associated with the leading edge housing may be controlled to minimize ice formation while also minimizing thermal stress placed on the materials of the leading edge housing. These and other features will be described in greater detail herein.

Thus, according to some embodiments, apparatus for preventing formation of ice on an engine are disclosed. In some embodiments, the apparatus may include a nozzle housing having an internal cavity defining an internal volume of the nozzle housing. The nozzle housing may be configured to receive gases from a compression stage of the engine. Moreover, the nozzle housing may be further configured to provide at least some of the gases to a leading edge housing of the engine. The apparatus may further include a first nozzle included in a first portion of the nozzle housing. The first nozzle may be configured to generate a first flow pattern. The first nozzle may be further configured to generate a first flow of a first portion of the gases into an internal volume of the leading edge housing based on the first flow pattern. The apparatus may further include a second nozzle included in a second portion of the nozzle housing. The second nozzle may include a concentric nozzle configured to generate a second flow pattern. The second nozzle may be configured to generate a second flow of a second portion of the gases into the internal volume of the leading edge housing based on the second flow pattern.

In some embodiments, a ratio of a first area of the first nozzle to a second area of the second nozzle is between about 50:50 and 60:40. Moreover, the first nozzle may have a positional offset of between about 0.25 inches and 0.75 inches from a centerline of the nozzle housing. Furthermore, the first nozzle may have an angular offset of between about 15 degrees and 25 degrees from a centerline of the leading edge housing. In some embodiments, the second nozzle may have a positional offset of between about 0.25 inches and 0.75 inches from a centerline of the nozzle housing. Furthermore, the second nozzle may have an angular offset of between about 15 degrees and 25 degrees from a centerline of the leading edge housing. In some embodiments, the first nozzle and the second nozzle may be separated by a distance of between about 1 inch and 1.5 inches along a body of the nozzle housing. In some embodiments, the leading edge housing includes an annular chamber coupled to a leading edge of an engine nacelle that includes the engine. The compression stage of the engine may be coupled to a high pressure manifold system that may be coupled to the nozzle housing. Furthermore, the first nozzle and the second nozzle may be configured to entrain a volume of gas included in the internal volume of the leading edge housing and cause a substantially uniform distribution of thermal energy within the internal volume of the leading edge housing. In some embodiments, the nozzle housing, the first nozzle, and the second nozzle each include a material that includes a nickel alloy. In some embodiments, the nickel alloy may be Inconel 625.

Also disclosed herein are methods for preventing formation of ice on an engine. The methods may include receiving, at a nozzle housing, gases from a compression stage of an engine. The methods may also include providing, via a first nozzle, a first portion of the gases to an internal volume of a leading edge housing of the engine, where the first nozzle provides the first portion of the gases based on a first flow pattern. The methods may also include providing, via a second nozzle, a second portion of the gases to the internal volume of the leading edge housing of the engine, where the second nozzle provides the second portion of the gases based on a second flow pattern, where the second flow pattern is determined based, at least in part, on a concentric geometry of the second nozzle.

In some embodiments, a ratio of a first area of the first nozzle to a second area of the second nozzle is between about 50:50 and 60:40. The first nozzle and the second nozzle may each have a positional offset of between about 0.25 inches and 0.75 inches and an angular offset of between about 15 degrees and 25 degrees. In some embodiments, the methods may further include entraining a volume of gas included in the internal volume of the leading edge housing, and distributing thermal energy within the internal volume of the leading edge housing such that the distribution of the thermal energy within the internal volume is substantially uniform. Moreover, an average temperature of the leading edge housing may be between about 290 degrees Fahrenheit and 420 degrees Fahrenheit.

Also disclosed herein are systems for preventing formation of ice on an engine. The systems may include an engine nacelle including a plurality of compression stages configured to pressurize gases and a leading edge housing coupled to a leading edge of the engine nacelle, where the leading edge housing includes an annular chamber defining a first internal volume. The systems may also include a manifold system configured to receive gases from at least one of the plurality of compression stages of the engine nacelle and a nozzle housing mounted within the leading edge housing.

The nozzle housing may include an internal cavity defining a second internal volume, and the nozzle housing may be configured to receive gases from the manifold system. The systems may further include a first nozzle included in a first portion of the nozzle housing. The first nozzle may be configured to generate a first flow pattern, and may be further configured to generate a first flow of a first portion of the gases into the first internal volume of the leading edge housing based on the first flow pattern. The systems may also include a second nozzle included in a second portion of the nozzle housing. The second nozzle may include a concentric nozzle configured to generate a second flow pattern. The second nozzle may be configured to generate a second flow of a second portion of the gases into the first internal volume of the leading edge housing based on the second flow pattern.

In some embodiments, a ratio of a first area of the first nozzle to a second area of the second nozzle is between about 50:50 and 60:40. The first nozzle and the second nozzle may each have a positional offset of between about 0.25 inches and 0.75 inches and an angular offset of between about 15 degrees and 25 degrees. In some embodiments, an opening of the second nozzle has an outer diameter of between about 0.75 inches and 1 inch. Moreover, the opening may have an inner diameter of between about 0.5 inches and 0.75 inches. In some embodiments, the first nozzle and the second nozzle are configured to entrain a volume of gas included in the first internal volume of the leading edge housing and cause a substantially uniform distribution of thermal energy within the first internal volume of the leading edge housing.

DETAILED DESCRIPTION

Figure 1:
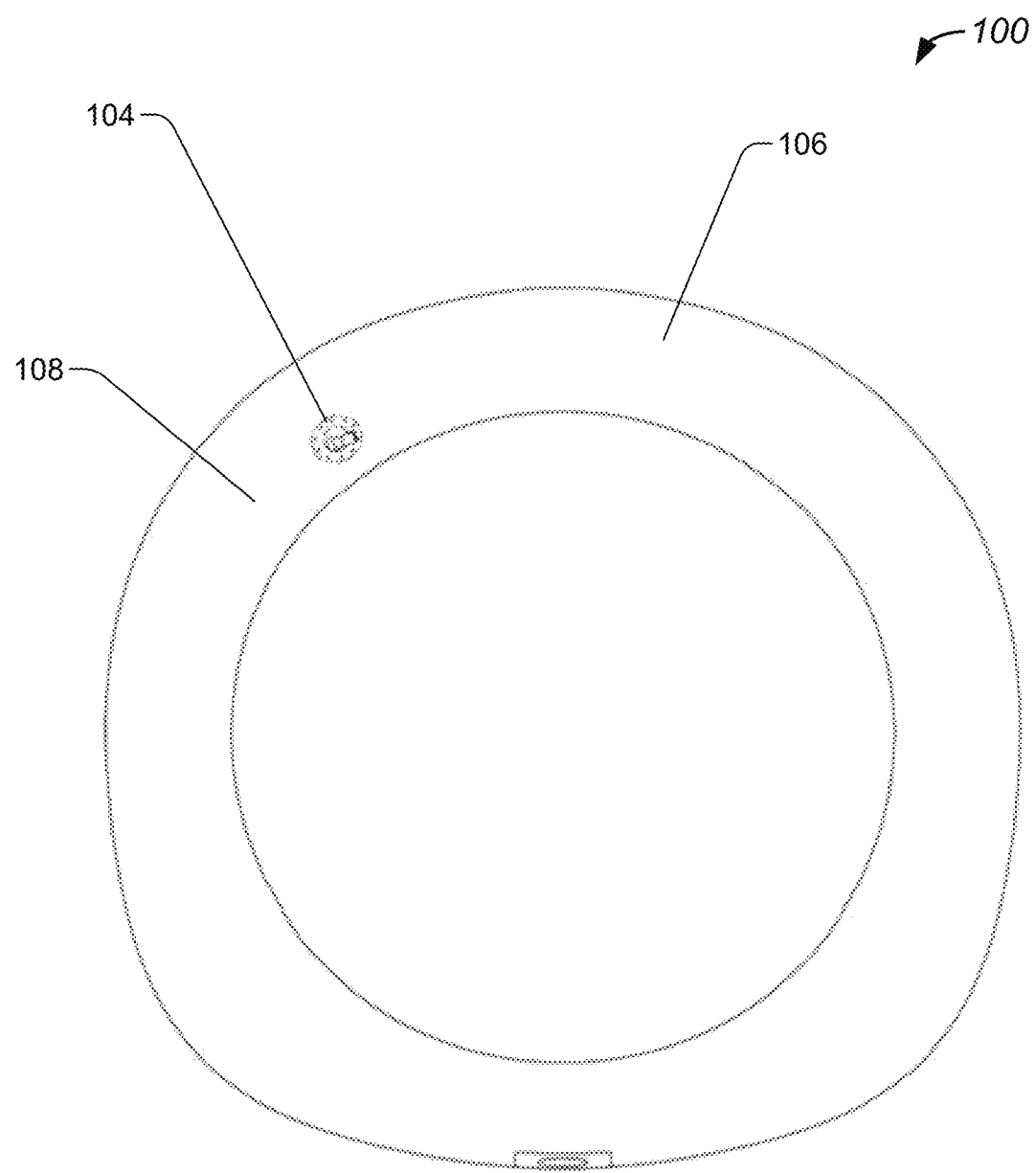
FIG. 1 illustrates a front view of a leading edge housing that may include a nozzle housing, implemented in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

The formation of ice on an aircraft component, such as an engine nacelle, may adversely affect various flight properties of the aircraft. For example, ice that has formed on an engine nacelle may adversely affect airflow around the engine nacelle and impede the aerodynamics of the engine nacelle. Moreover, ice that has formed on components of the aircraft, such as the engine nacelle, may be extremely hazardous if such ice breaks free and collides with or impacts another part of the aircraft. Accordingly, the prevention of the formation of such ice may be desirable to ensure safe and effective operation of the aircraft.

Conventional methods have attempted to prevent the formation of ice on the leading edge of an engine nacelle by ducting hot gases into a compartment adjacent to the engine nacelle in order to heat the leading edge and prevent the formation of the ice. However, the conventional techniques typically utilize inefficient and ineffective mechanisms for delivery of the hot gases into the compartment. This may result in hot spots which may be in excess of 450 degrees Fahrenheit. Such temperatures at the hot spots may cause undue thermal stress on the materials of the compartment, and ultimately cause damage to the compartment and the engine nacelle itself. Moreover, due to inefficient delivery of the gases within the compartment, the conventional techniques may also result in cold spots which may get cold enough to enable the formation of ice. Thus, conventional techniques are not entirely effective at preventing the formation of ice and often place too much thermal strain on the materials of the engine nacelle.

Various systems, methods, and apparatus are disclosed herein that prevent the formation of ice on the leading edge of an engine nacelle while controlling a temperature of a hot spot and a temperature of a cold spot associated with a leading edge housing to minimize ice formation and minimize thermal strain placed on the materials of the leading edge housing. Accordingly, an engine nacelle may include a leading edge housing which may be an annular compartment that is mounted on a leading edge of the engine nacelle. The annular compartment may be substantially hollow and may define an internal volume that may receive heated gases from one or more nozzles of a nozzle housing. Accordingly, a nozzle housing may receive gases, which may be heated by ordinary operation of the engine, from a compression stage of the engine. The nozzle housing may provide the gases to the internal volume of the leading edge housing. The nozzle housing may include a first nozzle and a second nozzle, where the second nozzle is a concentric nozzle. The first nozzle and the second nozzle may be configured to cause the gases to circulate within the internal volume of the leading edge housing to heat the leading edge housing in a substantially uniform fashion. As used herein, substantially uniform may refer to a difference between a temperature of a hot spot and a temperature of a cold spot being less than 120 degrees Fahrenheit. By ensuring that the heat is substantially uniformly distributed, a temperature of the hot spot and a temperature of the cold spot associated with the leading edge housing may be controlled to minimize ice formation and minimize thermal strain placed on the materials of the leading edge housing.

FIG. 1 illustrates a front view of a leading edge housing that may include a nozzle housing, implemented in accordance with some embodiments. As similarly discussed above, a leading edge of an engine nacelle of a vehicle, such as an airplane, may include a compartment configured to use heated gases received from one or more components of the engine to prevent the formation of ice on the engine nacelle. Accordingly, a leading edge housing, such as leading edge housing 100, may be an annular chamber that includes an internal volume configured to store gases received via an anti-ice nozzle, such as nozzle housing 104. In some embodiments, leading edge housing 100 may include a first surface, which may be a lipskin of a D-duct mounted on the leading edge of an airplane engine nacelle. Moreover, leading edge housing 100 may include a second surface which may be an interior bulkhead. The first and second surface of leading edge housing 100 may define an internal volume of leading edge housing 100 that may temporarily store or retain gases received via nozzle housing 104. Accordingly, the gases stored in the internal volume of leading edge housing 100 may transfer thermal energy to leading edge housing 100 and may prevent the formation of ice an exterior of leading edge housing 100. In some embodiments, leading edge housing 100 further includes an exhaust vent or valve that facilitates the release of gases from the internal volume of leading edge housing 100 once the gases have cooled.

In some embodiments, nozzle housing 104 is configured to receive gases from a portion of the engine nacelle, such as a compression stage of the engine, and provide the gases to the internal volume of leading edge housing 100. In various embodiments, nozzle housing 104 may include a plurality of nozzles that may be oriented in a direction relative to the centerline of leading edge housing 100, which may be circular. When oriented in this way, the gases released by the nozzles of nozzle housing 104 cause the gases included in the internal volume of leading edge housing 100 to swirl or rotate in a direction substantially similar to the direction of flow of gases released from nozzle housing 104. As the gases proceed around the interior of leading edge housing 100 they may cool. Thus, hot spots and cold spots may form in the surface temperature of leading edge housing 100 due to the varying temperatures of the gases included within its internal volume. A hot spot, such as hot spot 106, may occur where gases released from nozzle housing 104 impinge upon the interior surface of leading edge housing 100. A cold spot, such as cold spot 108, may occur just behind the nozzle at a point where the gases included within leading edge housing 100 have traveled almost entirely around the circumference of leading edge housing 100 and have cooled the most.

In various embodiments, nozzle housing 104 is configured to maximize the temperature of the cold spot and minimize the temperature of the hot spot while minimizing the flow of gases through nozzle housing 104. In this way, nozzle housing 104 efficiently distributes thermal energy within the internal volume of leading edge housing 100 while minimizing the thermal strain on the materials included in leading edge housing 100 and minimizing the potential of ice formation at a cold spot on the surface of leading edge housing 100. Details of nozzle housings are further discussed below with reference to nozzle housing 207 of FIG. 2, nozzle housing 300 of FIG. 3, nozzle housing 400 of FIG. 4, nozzle housing 500 of FIG. 5, nozzle housing 602 of FIG. 6, and the nozzle housings discussed with reference to the method of FIG. 7.

Figure 2:
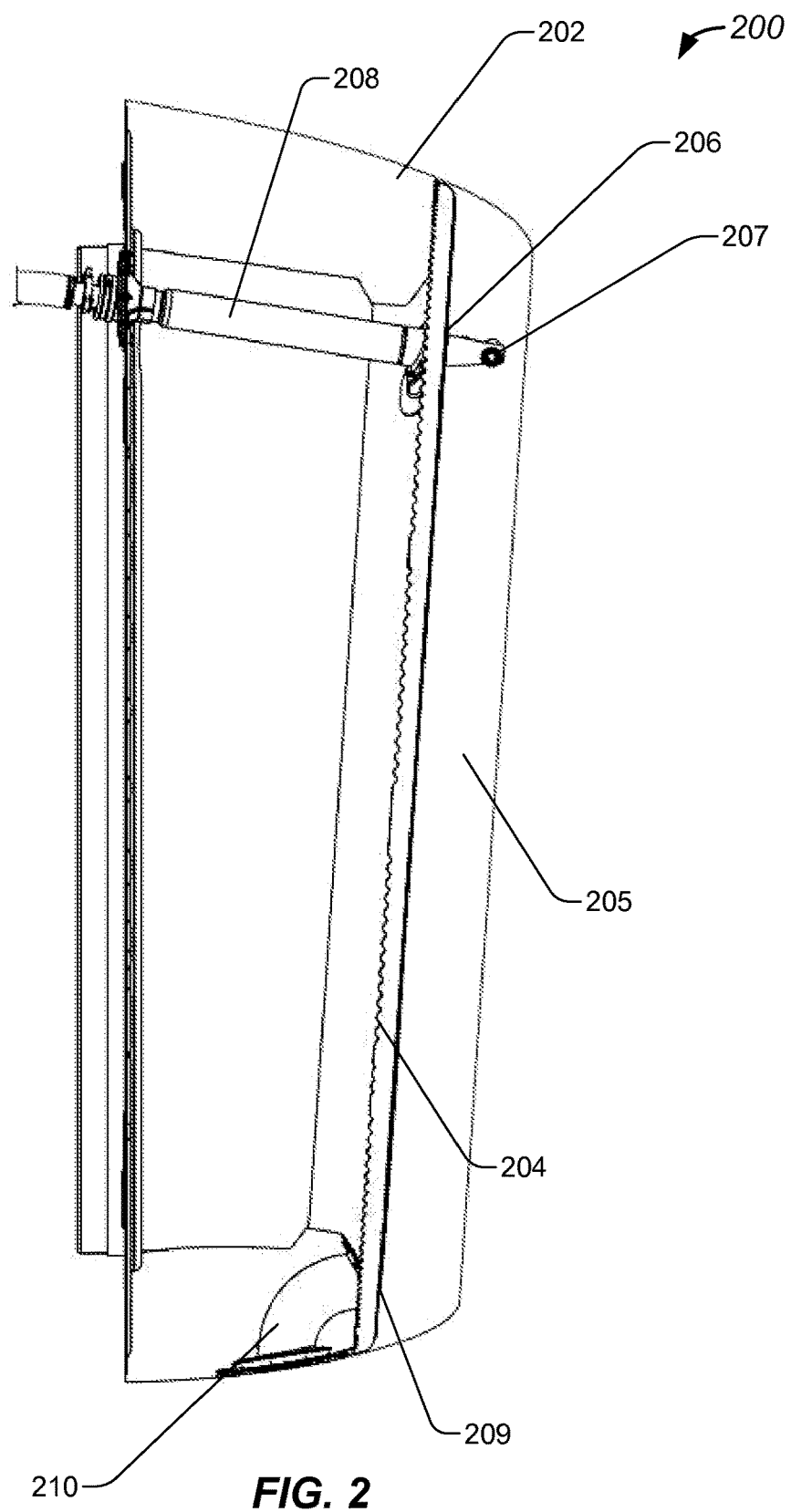
FIG. 2 illustrates a side view of a leading edge housing that may include a nozzle housing, implemented in accordance with some embodiments.

FIG. 2 illustrates a side view of a leading edge housing that may include a nozzle housing, implemented in accordance with some embodiments. As similarly discussed above with reference to leading edge housing 100 of FIG. 1, leading edge housing 200 may include first surface 202, which may be the lipskin of a D-duct, and second surface 204, which may be an interior bulkhead. First surface 202 and second surface 204 may be sealed at a contact area between the two to form internal volume 205. Furthermore, leading edge housing 200 may include one or more ports configured to be coupled to one or more tubes, conduits, or manifold systems. For example, leading edge housing 200 may include first port 206 which may be coupled to nozzle housing 207 and conduit 208. In some embodiments, conduit 208 may be coupled to a compression stage of an engine and may provide heated and compressed gases to nozzle housing 207 which subsequently provides the gases to internal volume 205. Leading edge housing 200 may further include second port 209 which may be coupled to conduit 210. In some embodiments, conduit 210 may be configured to provide a path to an exterior volume of air. In this way, conduit 210 may provide an exhaust path through which gases may be released from internal volume 205.

Figure 3:
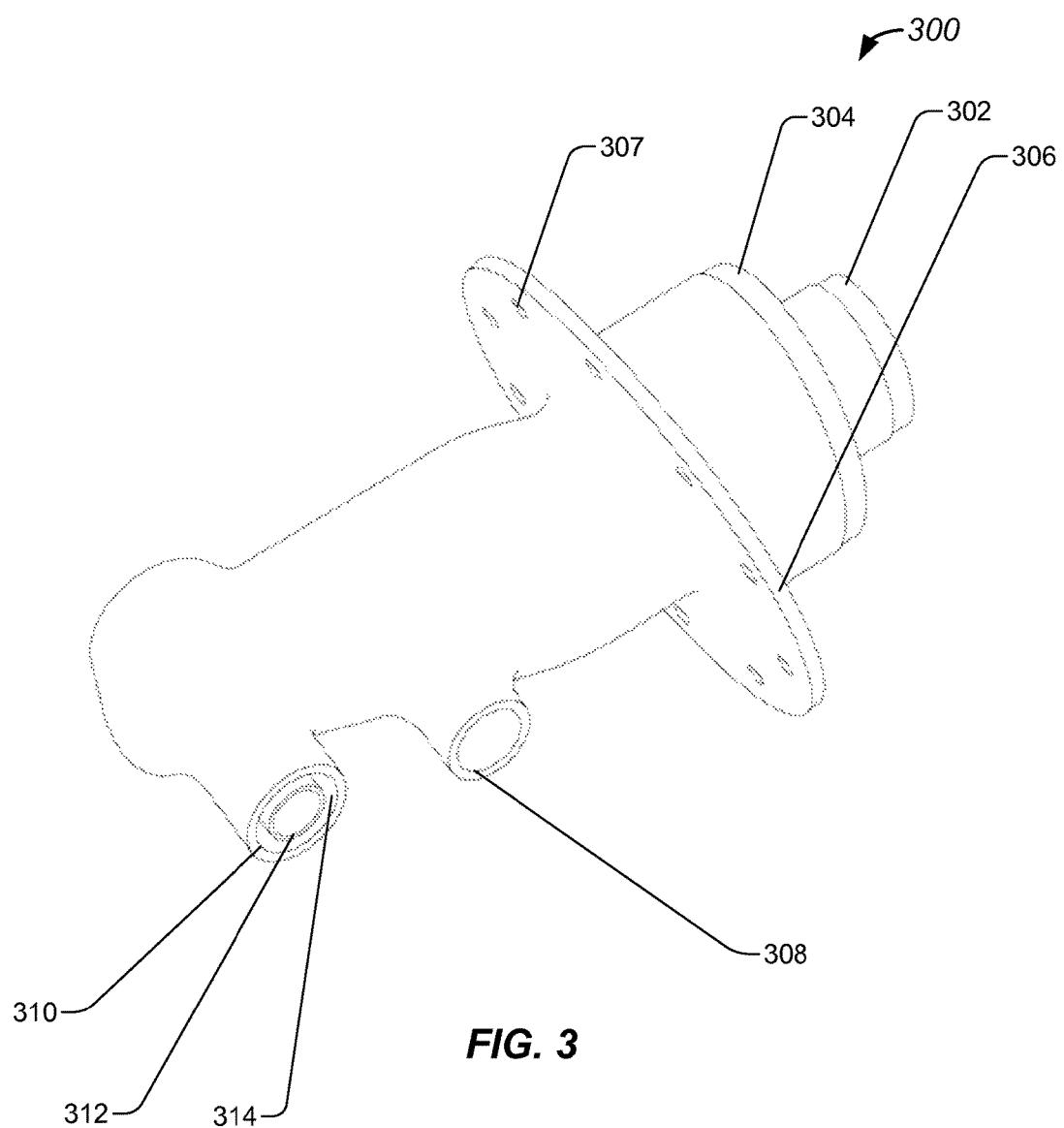
FIG. 3 illustrates an example of a nozzle housing implemented in accordance with some embodiments.

FIG. 3 illustrates an example of a nozzle housing implemented in accordance with some embodiments. Thus, an anti-ice nozzle may include nozzle housing 300 which may be configured to receive heated gases from a compression stage of an engine nacelle and further configured to provide the gases to an internal volume of a leading edge housing mounted to the leading edge of the engine nacelle. In some embodiments, nozzle housing 300 may include one or more flanges, such as first flange 302 and second flange 304. The one or more flanges may be configured to couple nozzle housing 300 to a source of the gases. For example, first flange 302 may be configured to be coupled to a pipe, tube, or conduit that may be included in a manifold system coupled to a compression stage of the engine. In some embodiments, second flange 304 may be configured to provide further coupling with the pipe or conduit and may provide additional structural support for the coupling or connection between nozzle housing 300 and the manifold system coupled to the compression stage. Nozzle housing 300 may also include collar 306 which may be configured to be coupled to a second surface of a leading edge housing, which may be an internal bulkhead. For example, collar 306 may include one or more holes, such as hole 307, which match holes in an internal bulkhead of the leading edge housing, and one or more fasteners, such as nuts and bolts, may be used to fasten collar 306, as well as nozzle housing 300, to the internal bulkhead. In some embodiments, the holes and fasteners may control or determine the positional tolerances of nozzles, such as nozzle housing 300, that may be included in the leading edge housing.

Nozzle housing 300 may include one or more nozzles, such as first nozzle 308 and second nozzle 310. As shown in FIG. 3, first nozzle 308 and second nozzle 310 may be oriented such that the direction of flows generated by first nozzle 308 and second nozzle 310 are substantially parallel to the internal bulkhead that may be attached to collar 306. In one example, as shown in greater detail with reference to FIG. 4, the orientation of the nozzles may form about a 90 degree angle with a centerline of the body of nozzle housing 300.

In some embodiments, first nozzle 308 may be included in a first portion of nozzle housing 300 and may be a flanged opening that provides a first flow path through which a first portion of gases received from the manifold system associated with the compression stage may be released into the internal volume of the leading edge housing of the engine nacelle. In some embodiments, first nozzle 308 may be configured to have a particular geometry. For example, the opening of first nozzle 308 may be circular or elliptical. In one example, first nozzle 308 may be configured to have a circular geometry having an interior diameter of between about 0.5 inches and 1 inch. For example, first nozzle 308 may have an interior diameter of about 0.721 inches. In this example, the opening of first nozzle 308 may generate a first flow pattern that is similar to a jet stream or flow. In some embodiments, first nozzle 308 may have a flow rate that may be determined based on one or more sizing conditions. In various embodiments, first nozzle 308 may have a flow rate of between about 10 pounds per minute and 15 pounds per minute. For example, first nozzle 308 may have a flow rate of about 12 pounds per minute.

In some embodiments, a placement of first nozzle 308 may be configured to minimize a temperature of a hot spot associated with the leading edge housing that includes nozzle housing 300. The placement of first nozzle 308 may also be configured to maximize a temperature of a cold spot associated with the leading edge housing. For example, a center of the opening of first nozzle 308 might not be along the centerline of nozzle housing 300, but might instead have a positional offset to one side or another. In some embodiments, offsetting first nozzle 308 in this way increases the distance between the flow emitted from first nozzle 308 and an internal surface of the leading edge housing. In this way, the impingement of the flow from first nozzle 308 upon the internal surface of the leading edge housing may be minimized and may occur further along the flow stream emitted by first nozzle 308, and the temperature of the resulting hot spot may be minimized. Furthermore, because the offset may increase the distance between the internal surface and the flow stream of first nozzle 308, the length of the flow stream emitted by first nozzle 308 may be longer, and may provide more efficient and enhanced entrainment of the gases included within the internal volume of the leading edge housing. In this way, the heated gases released by nozzle housing 300 may be mixed more efficiently and effectively to increase and maximize the temperature of a cold spot associated with the leading edge housing that includes nozzle housing 300. In some embodiments, the positional offset may be between about 0.25 inches and 0.75 inches from a centerline of nozzle housing 300. For example, the positional offset may be about 0.5 inches from the centerline of nozzle housing 300.

Further still, the angle of the direction of the flow emitted by first nozzle 308 may also be configured to minimize the temperature of the hot spot and maximize the temperature of the cold spot. For example, the direction of flow emitted by first nozzle 308 may be turned or rotated a particular amount from a centerline of the internal volume of the leading edge housing that includes nozzle housing 300. As is discussed in greater detail with reference to nozzle housing 602 of FIG. 6, the leading edge housing may have a circular geometry, and a centerline of the leading edge housing may refer to a central position along the internal bulkhead of the leading edge housing. In some embodiments, a direction along the centerline may refer to a direction tangential to the curvature of the leading edge housing at a particular location along the internal bulkhead of the leading edge housing. In some embodiments, first nozzle 308 may be configured to have an angular offset from the centerline. An angular offset may be a linear or radial distance from a direction along or tangential to the centerline of the leading edge housing. The angular offset may further increase the distance the flow stream emitted by first nozzle 308 travels before impinging upon the internal surface of the leading edge housing. In this way, the angular offset may also decrease the temperature of the hot spot of the leading edge housing while providing more efficient and effective entrainment of gases included within the internal volume of the leading edge housing and maximizing the temperature of its associated cold spot. In some embodiments, the angular offset may be between about 15 degrees and 25 degrees from a centerline of the leading edge housing. For example, the angular offset may be about 18 degrees from the centerline of the leading edge housing.

In various embodiments, second nozzle 310 may be a concentric nozzle that may be included in a second portion of nozzle housing 300. For example, as shown in FIG. 3, second nozzle 310 may be a flanged opening that includes inner flange 312 which may define a through-hole that passes through the body of nozzle housing 300. Thus, second nozzle 310 and inner flange 312 may define opening 314 which may provide a second flow path through which a second portion of gases received from the manifold system associated with a compression stage may be provided to the internal volume of the leading edge housing that includes nozzle housing 300. In some embodiments, the concentric geometry or design of second nozzle 310 generates a second flow pattern that is more diffuse than the first flow pattern of first nozzle 308. Because it is relatively diffuse, the second flow pattern provided by the concentric nozzle included in second nozzle 310 provides enhanced and efficient mixing of the second flow stream emitted by second nozzle 310 with the gases included in the internal volume of the leading edge housing. In this way, the second flow pattern generated by the concentric geometry of second nozzle 310 may minimize the temperature of the hot spot associated with the leading edge housing that includes nozzle housing 300. In some embodiments, an opening, such as opening 314, of second nozzle 310 may have an outer diameter of between about 0.75 inches and 1 inch. For example, the outer diameter may be about 0.912 inches. Furthermore, an inner diameter of opening 314, which may be defined by inner flange 312, may be between about 0.5 inches and 0.75 inches. For example, the inner diameter may be about 0.625 inches. Moreover, second nozzle 310 may have a flow rate of between about 5 pounds per minute and 15 pounds per minute. For example, second nozzle 310 may have a flow rate of about 10 pounds per minute.

Moreover, the second flow pattern emitted by second nozzle 310 may, at least in part, delay or minimize the interaction between the first flow pattern emitted by first nozzle 308 and an internal surface of the leading edge housing. For example, the second flow pattern provided by the concentric geometry of second nozzle 310 may delay or minimize an interaction and/or attachment of the first flow pattern from first nozzle 308, which may be a jet stream, to an internal surface of the leading edge housing, such as a lipskin or internal bulkhead. In this way, the second flow pattern provided by second nozzle 310 may maintain, at least in part, the momentum of the first flow stream of first nozzle 308, thus increasing the efficiency and efficacy of the first flow stream when mixing with and entraining gases included in the internal volume of the leading edge housing. Accordingly, the concentric nozzle included in second nozzle 310 may further decrease a temperature of a hot spot and increase a temperature of a cold spot associated with a leading edge housing that includes nozzle housing 300.

As similarly discussed above with reference to first nozzle 308, second nozzle 310 may also include a positional offset and an angular offset that may be configured to decrease the temperature of the hot spot of the leading edge housing and increase the temperature of the cold spot of the leading edge housing. In some embodiments, second nozzle 310 may have a positional offset of between about 0.25 inches and 0.75 inches from a centerline of nozzle housing 300. For example, second nozzle 310 may have a positional offset of about 0.5 inches from the centerline of nozzle housing 300. Moreover, second nozzle 308 may have an angular offset of between about 15 degrees and 25 degrees from a centerline of the leading edge housing. For example, second nozzle 310 may have an angular offset of about 18 degrees from the centerline of the leading edge housing.

In various embodiments, one or more relationships or ratios between first nozzle 308 and second nozzle 310 may be configured to minimize a temperature of a hot spot and maximize a temperature of a cold spot of the leading edge housing that includes nozzle housing 300. In some embodiments, a ratio of a first area of an opening of first nozzle 308 to a second area of an opening of second nozzle 310 may be between about 50:50 and 60:40. For example, the ratio may be about 55:45. Moreover, a ratio of a first flow path of first nozzle 308 to a second flow path of second nozzle 310 may be between about 50:50 and 60:40. For example, the ratio of the first flow path to the second flow path may be about 55:45.

Figure 4:
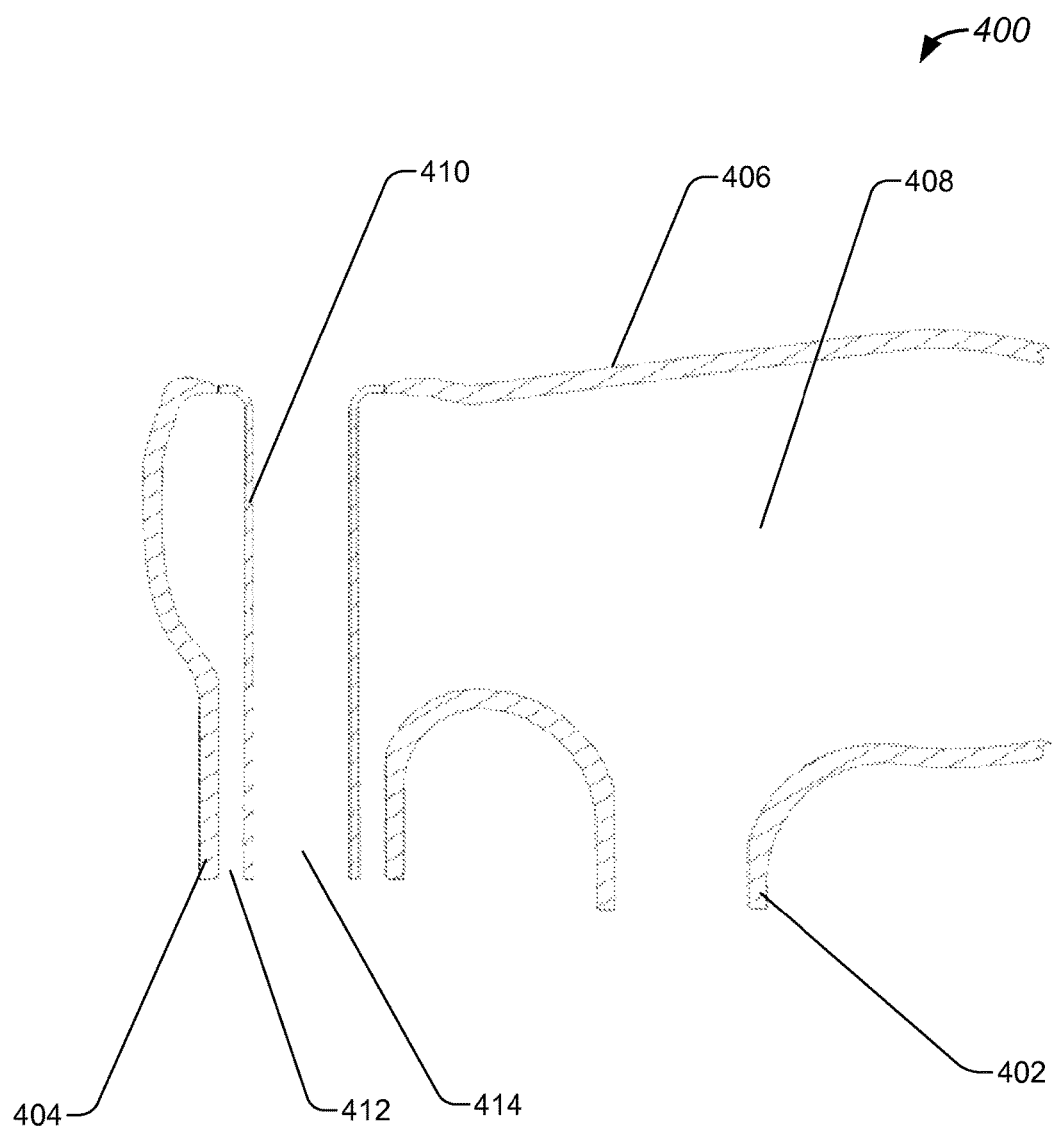
FIG. 4 illustrates a cross-section of an example of a nozzle housing implemented in accordance with some embodiments.

FIG. 4 illustrates a cross-section of an example of a nozzle housing implemented in accordance with some embodiments. As similarly discussed above with reference to nozzle housing 300 of FIG. 3, and below with reference to nozzle housing 500 of FIG. 5 and nozzle housing 602 of FIG. 6, nozzle housing 400 may include first nozzle 402 and second nozzle 404. Nozzle housing 400 may be configured to receive gases from a manifold system associated with a compression stage of a jet engine. Accordingly, nozzle housing 400 may include body 406 which may define internal volume 408. Internal volume 408 may be configured to receive the heated and pressurized gases from the manifold system and provide the gases to first nozzle 402 and second nozzle 404. As shown in FIG. 4, first nozzle 402 may be a flanged opening that produces a first flow pattern that may be a jet flow or stream.

In various embodiments, second nozzle 404 defines an outer diameter of opening 412. As shown in FIG. 4, second nozzle 404 may also include inner flange 410 which may define an inner diameter of opening 412. As previously discussed, inner flange 410 may be substantially hollow and may define through-hole 414 which passes through body 406 and nozzle housing 400. Accordingly, opening 412, as defined by the flanged portion of second nozzle 404 and inner flange 410, provides a second flow path for gases included in internal volume 408 that has a second flow pattern. As similarly discussed above, the second flow pattern may be substantially more diffuse than the jet flow or jet stream generated by first nozzle 402. In some embodiments, first nozzle 402 may be separated from second nozzle 404 by a distance of between about 1 inch and 1.5 inches. For example, first nozzle 402 and second nozzle 404 may be separated by a distance of about 1.25 inches.

Figure 5:
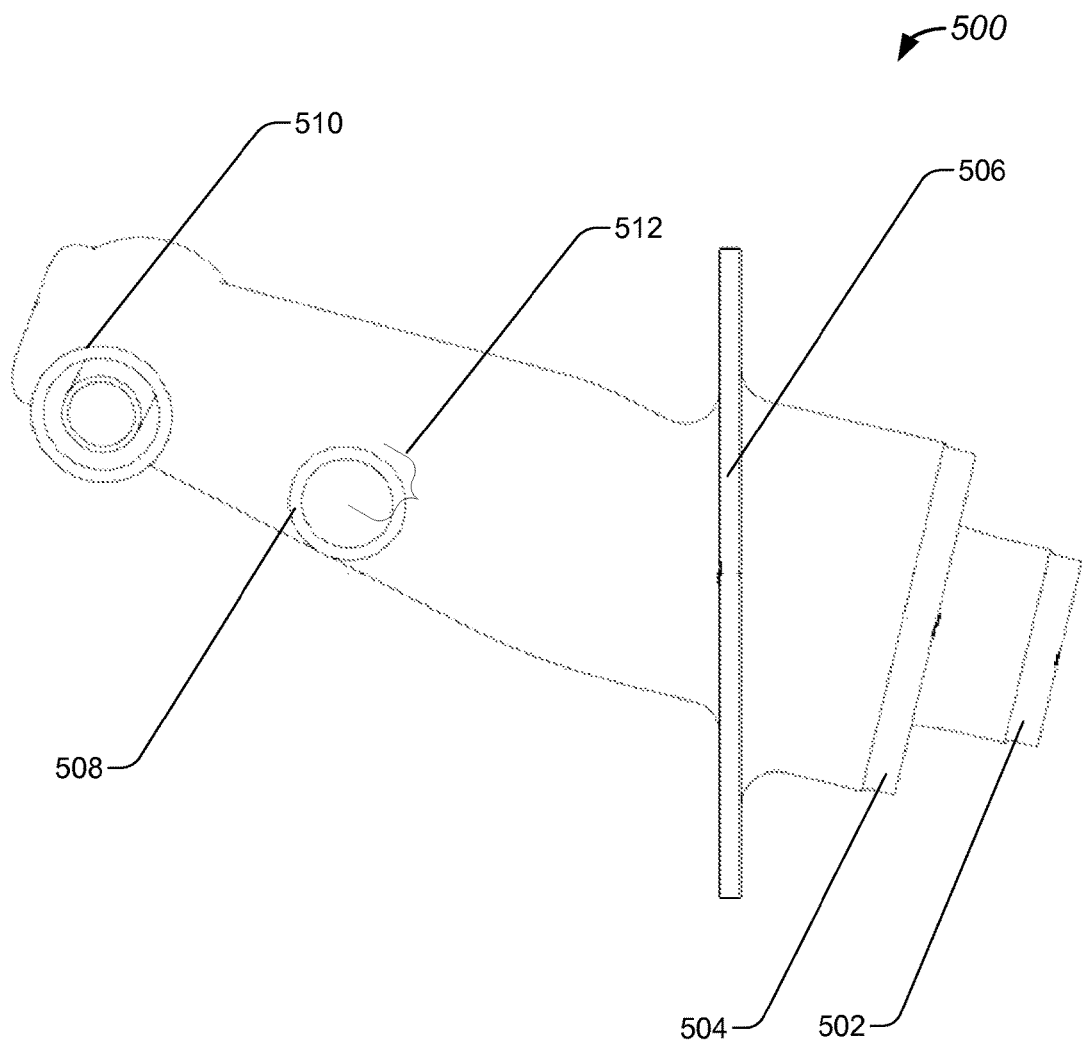
FIG. 5 illustrates another example of a nozzle housing implemented in accordance with some embodiments.

FIG. 5 illustrates another example of a nozzle housing implemented in accordance with some embodiments. As similarly discussed with reference to nozzle housing 300 of FIG. 3, nozzle housing 400 of FIG. 4, and nozzle housing 602 of FIG. 6, nozzle housing 500 may include first flange 502, second flange 504, and collar 506. Accordingly, first flange 502 and second flange 504 may be coupled to a manifold system associated with a compression stage of an engine, and may be configured to receive compressed gases from the compression stage of the engine. Collar 506 may be configured to be coupled to an inner surface, such as an internal bulkhead, of a leading edge housing of an engine nacelle, thus providing a structural anchor and structural support for nozzle housing 500. Moreover, as FIG. 5 illustrates, collar 506 is angled with respect to an orientation of nozzle housing 500 to achieve a particular angle of attachment between nozzle housing 500 and the inner surface of the leading edge housing. The angled attachment between nozzle housing 500 and the inner surface of the leading edge housing may ensure that nozzle housing 500 penetrates the inner surface and is positioned substantially on the centerline of the inner surface of the leading edge housing while satisfying other structural requirements of the leading edge housing and engine nacelle that includes the leading edge housing.

Moreover, nozzle housing 500 may include first nozzle 508 and second nozzle 510. As shown in FIG. 5, first nozzle 508 has been configured to have a positional offset, such as positional offset 512, from a centerline of nozzle housing 500. In some embodiments, a positional offset may be a distance or offset between a center of an opening of a nozzle, such as a center of the opening defined by first nozzle 508, and the centerline of a nozzle housing relative to the direction that the nozzle faces, such as a centerline of nozzle housing 500. Thus, the positional offset may identify or define a distance between the center of the opening and a centerline of the nozzle housing. In some embodiments, the positional offset increases the distance between the first flow generated by first nozzle 508 and the inner surface that is coupled to collar 506. In this way, the additional distance provided by the positional offset of first nozzle 508, which may be positional offset 512, decreases the contact between the first flow pattern generated by first nozzle 508 and the internal bulkhead that nozzle housing 500 is attached to. This results in decreased heating of the internal bulkhead as well as an increased travel distance of the first flow.

Accordingly, the positional offset of first nozzle 508 may decrease the temperature of a hot spot that may be generated by the impingement of the first flow on the inner surface. The positional offset may also increase the temperature of a cold spot that may be behind nozzle housing 500 due to the increased efficiency and efficacy of entrainment of the gases included in the internal volume of the leading edge housing. Furthermore, as also shown in FIG. 5, both first nozzle 508 and second nozzle 510 have been configured to have an angular offset that increases the length of the first flow stream and second flow stream. The increased length of the flow streams further facilitates the minimization of the temperature of the hot spot and the maximization of the temperature of the cold spot.

Figure 6:
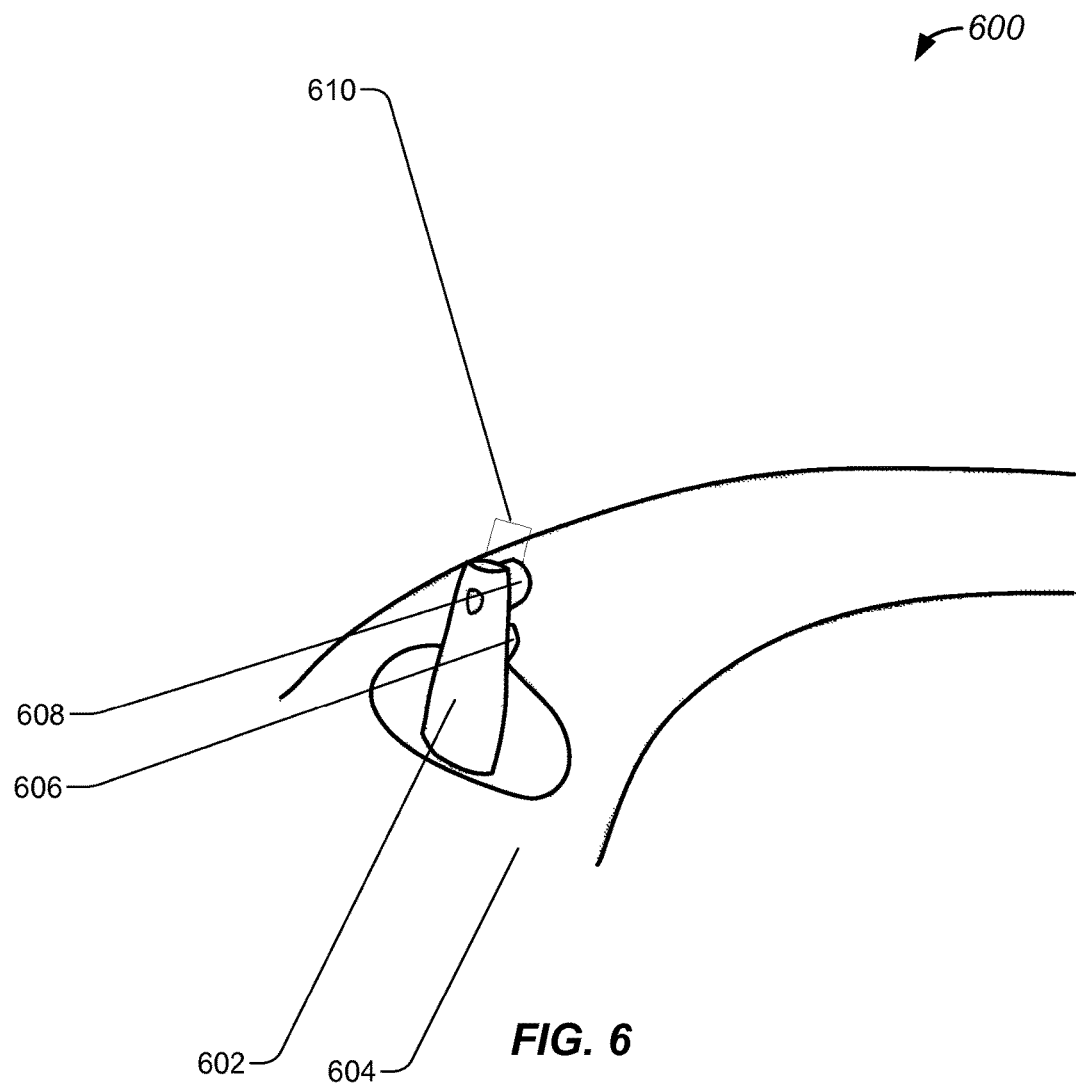
FIG. 6 illustrates yet another example of a nozzle housing implemented in accordance with some embodiments.

FIG. 6 illustrates yet another example of a nozzle housing implemented in accordance with some embodiments. As shown in FIG. 6, leading edge housing 600 may include nozzle housing 602, which may be a nozzle housing as discussed above with reference to nozzle housing 300 of FIG. 3, nozzle housing 400 of FIG. 4, and nozzle housing 500 of FIG. 5. In various embodiments, nozzle housing 602 may include first nozzle 606 and second nozzle 608, and may be coupled to a surface of leading edge housing 600, which may be internal bulkhead 604. It will be appreciated that leading edge housing 600 may also include another surface, such as a lipskin. However, to facilitate the illustration of nozzle housing 602, such another surface has not been shown in FIG. 6. Moreover, FIG. 6 illustrates a portion of leading edge housing 600. As similarly discussed above with reference to FIG. 1 and FIG. 2, leading edge housing 600 may be a substantially circular and enclosed housing mounted on the leading edge of an engine nacelle. As shown in FIG. 6, internal bulkhead 604 is also substantially circular, and has an annular or ring shape.

As similarly discussed above, the angle of the direction of the flow emitted by first nozzle 606 and/or second nozzle 608 may be configured to minimize the temperature of a hot spot and maximize the temperature of a cold spot associated with leading edge housing 600. In one example, the direction of flow emitted by first nozzle 606 and/or second nozzle 608 may be configured to have an angular offset, such as angular offset 610, and may be turned or rotated a particular amount or degree from a centerline of internal bulkhead 604. As shown in FIG. 6, the direction of flow emitted by first nozzle 606 and/or second nozzle 608 may have an angular offset and be rotated about 18 degrees towards the center of the circle that leading edge housing 600 forms. In various embodiments, the angular offset applied to first nozzle 606 and/or second nozzle 608 further increases the distance their respective flow streams travel within the internal volume of leading edge housing 600 before contacting or impinging upon a surface of leading edge housing 600, which may be a surface such as a lipskin. In this way, the angular offset decreases the temperature of the hot spot that results from the contact of the flow streams with leading edge housing 600 while providing more efficient and effective entrainment of gases included within the internal volume of the leading edge housing and maximizing the temperature of its associated cold spot.

Figure 7:
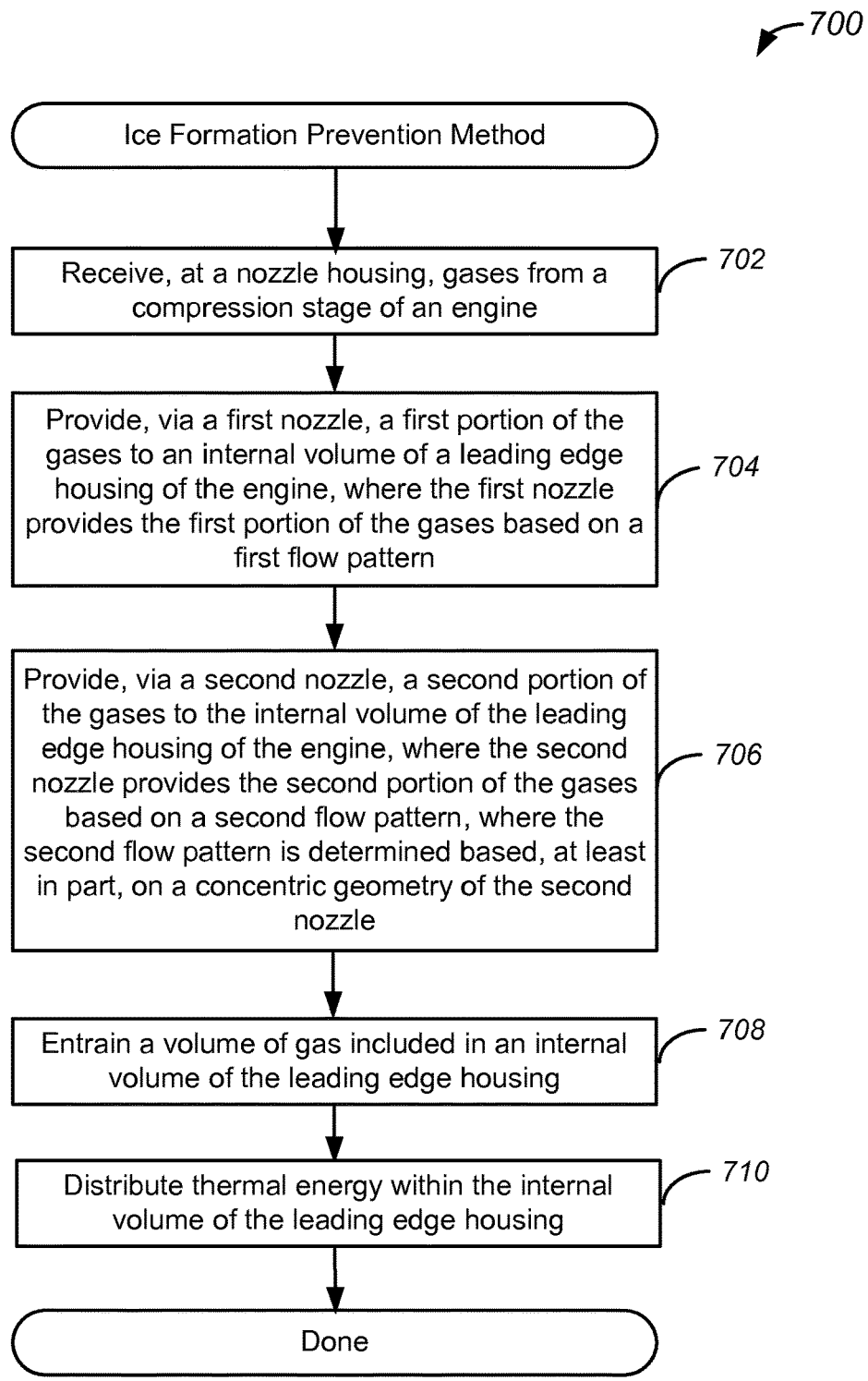
FIG. 7 illustrates a method of using a nozzle housing, implemented in accordance with some embodiments.

FIG. 7 illustrates a method of using a nozzle housing, implemented in accordance with some embodiments. As similarly discussed above, a nozzle housing may include a first nozzle and a second nozzle that may be configured to provide gases received from a compression stage of an engine to an internal volume of a leading edge housing. In various embodiments, method 700 provides for the use of such a nozzle housing to efficiently and effectively distribute gases within the internal volume of the leading edge housing, and to minimize a temperature of a hot spot and maximize the temperature of a cold spot associated with the leading edge housing.

Accordingly, during operation 702, method 700 may commence by receiving, at a nozzle housing, gases from a compression stage of an engine. As similarly discussed above, and illustrated below with reference to system 800 of FIG. 8, the nozzle housing may be coupled to a pipe, conduit, or manifold system that may be coupled to a compression stage of an engine, which may be a jet engine. In various embodiments, in response to the activation of a valve or other mechanical switch, gases may be bled from the compression stage and provided to a portion of the nozzle housing. The nozzle housing may receive the gases and channel them within an internal volume of the nozzle housing.

During operation 704, method 700 may proceed by providing, via a first nozzle, a first portion of the gases to an internal volume of a leading edge housing of the engine, where the first nozzle provides the first portion of the gases based on a first flow pattern. Accordingly, at least a portion of the gases received and channeled through the internal volume of the nozzle housing may be provided to the first nozzle, and the first nozzle may provide a first flow path through which the first portion of the gases may be provided to the internal volume of the leading edge housing. As similarly discussed above, the first nozzle may be a flanged opening having a first flow pattern that is substantially like a jet stream or flow. Furthermore, the first nozzle may have an opening diameter of 0.721 inches. Further still, the first nozzle may be configured to have a positional and/or angular offset to minimize the temperature of the hot spot and maximize the temperature of the cold spot. For example, the first nozzle may have a positional offset of about 0.5 inches and an angular offset of about 18 degrees.

During operation 706, method 700 may proceed by providing, via a second nozzle, a second portion of the gases to the internal volume of the leading edge housing of the engine. As similarly discussed above, the gases received and channeled through the internal volume of the nozzle housing may be provided to the second nozzle which may then provide a second flow path through which the second portion of the gases may be provided to the internal volume of the leading edge housing. In some embodiments, the second nozzle provides the second portion of the gases based on a second flow pattern that may be determined based, at least in part, on a concentric geometry of the second nozzle. Thus, the second flow pattern may be more diffuse than the first flow pattern. Moreover, the second nozzle may have an opening that has an outer diameter of about outer diameter of about 0.912 inches and an inner diameter of about 0.625 inches, and the second nozzle may be configured to have a positional and/or angular offset to minimize the temperature of the hot spot and maximize the temperature of the cold spot. For example, the second nozzle may have a positional offset of about 0.5 inches and an angular offset of about 18 degrees. Moreover, the providing of the second portion of gases via the second nozzle may, at least in part, delay or minimize the interaction between the first flow emitted by the first nozzle and an internal surface of the leading edge housing.

During operation 708, method 700 may proceed by entraining a volume of gas included in an internal volume of the leading edge housing. In various embodiments, the leading edge housing already includes at least some gases which may, for example, have been introduced during a previous iteration of method 700. In some embodiments, the existing volume of gas may be entrained or drawn in by the first flow generated by the first nozzle and the second flow generated by the second nozzle. In this way, the first flow and second flow may cause gases included in the internal volume the leading edge housing to rotate or swirl in a particular direction that is consistent with or co-directional with the direction of the first flow and the second flow. Accordingly, gases may flow and rotate around the entire interior of the leading edge housing.

During operation 710, method 700 may proceed by distributing thermal energy within the internal volume of the leading edge housing. As similarly discussed above, the gases received from the compression stage of the engine may be heated in excess of 500 degrees Fahrenheit. As the gasses are distributed within the internal volume of the leading edge housing, the thermal energy included in the gases may be distributed as well. Thus, it will be appreciated that operation 710 may be performed concurrently with and as part of operation 708. Accordingly, as the gases are distributed within the internal volume of the leading edge housing, thermal energy is transferred to one or more components of the leading edge housing, such as its lipskin. In this way, the leading edge housing may be heated, and the formation of ice may be prevented. Moreover, the substantially uniform distribution of gases provided by the use of the first nozzle and second nozzle having a concentric geometry effectively minimizes a temperature of a hot spot and maximizes a temperature of a cold spot associated with the leading edge housing. For example, the temperature of the hot spot might not exceed 420 degrees Fahrenheit while the temperature of the cold spot might not go below 290 degrees Fahrenheit. In other words, the temperature of the leading edge housing may be between 290 degrees Fahrenheit and 420 degrees Fahrenheit in this example. In another example, the temperature of the hot spot might not exceed 400 degrees Fahrenheit while the temperature of the cold spot might not go below 310 degrees Fahrenheit. In these examples, the substantially uniform distribution of the thermal energy within the internal volume of the leading edge housing ensures that thermal stress on the material of the leading edge housing, which may be aluminum, is minimized, while the possibility of ice formation along the entirety of the exterior of the leading edge housing is also minimized. The temperature of the gas supplied through the nozzle may be in the range of 300 degrees Fahrenheit and 1100 degrees Fahrenheit or, more specifically, between about 800 degrees Fahrenheit and 900 degrees Fahrenheit, such as about 855 degrees Fahrenheit. High gas temperatures may occur, for example, during transient failure cases. Low gas temperatures may occur, for example, during low ambient temperatures (e.g., cold days). It should be noted that despite this variation of gas temperatures, the temperature of the leading edge housing may be within the specified range due to a particular design of the nozzle.

Figure 8:
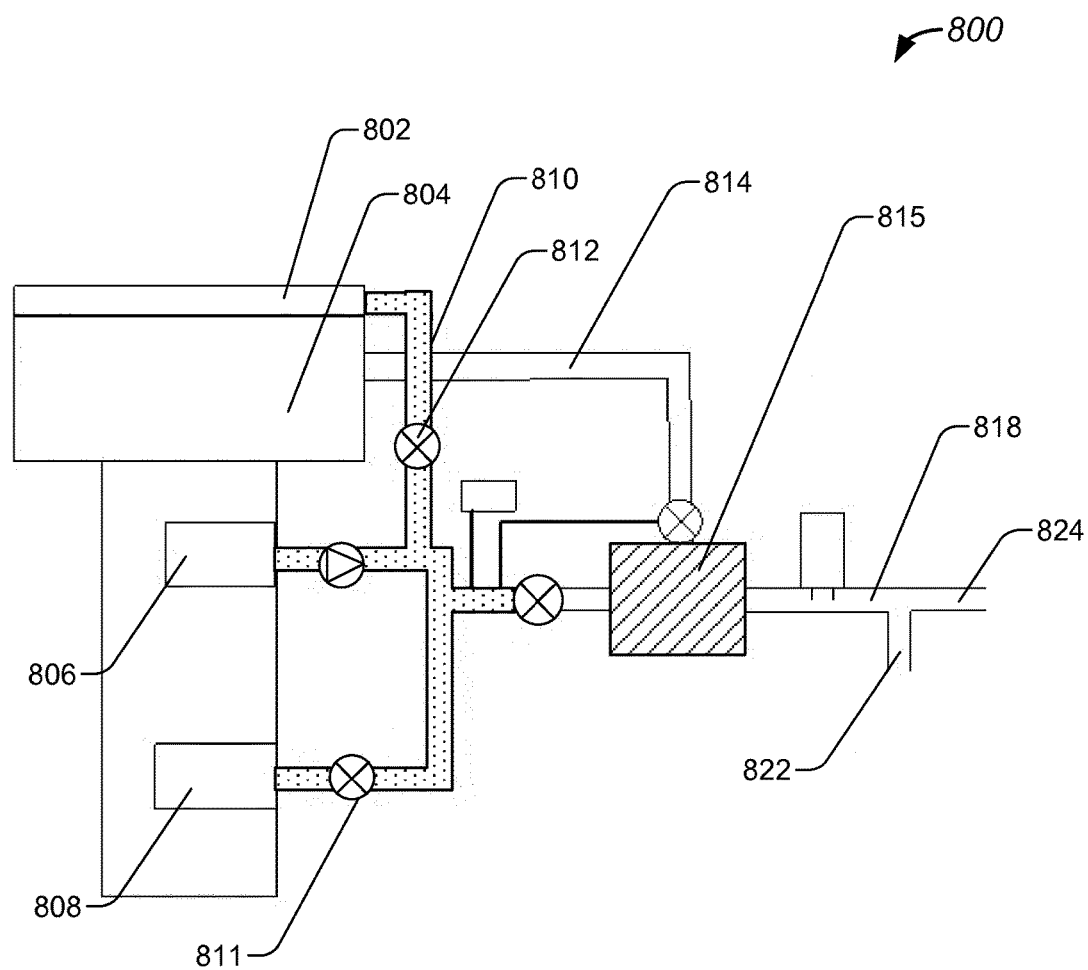
FIG. 8 illustrates an anti-ice system that may include a nozzle housing, implemented in accordance with some embodiments.

FIG. 8 illustrates an anti-ice system that may include a nozzle housing, implemented in accordance with some embodiments. As similarly discussed above with reference to leading edge housing 100 of FIG. 1 and leading edge housing 200 of FIG. 2, system 800 may include leading edge housing 802. In various embodiments, leading edge housing 802 is configured to prevent the formation of ice on an exterior surface of an engine nacelle that includes system 800. For example, leading edge housing 802 may include an anti-ice nozzle, such as a nozzle housing as discussed above with reference to nozzle housing 104 of FIG. 1, nozzle housing 207 of FIG. 2, nozzle housing 300 of FIG. 3, nozzle housing 400 of FIG. 4, nozzle housing 500 of FIG. 5, nozzle housing 602 of FIG. 6, and the nozzle housings discussed with reference to the method of FIG. 7. In this way, an exterior surface of leading edge housing 802 may be kept substantially free of ice when the engine nacelle is in operation.

System 800 may further include fan 804 and various compression stages that may be part of a compression system of the engine nacelle that includes system 800, which may be a jet engine. For example, the compression system may include numerous compression stages, such as compression stage 806 and additional compression stage 808. Each of compression stage 806 and additional compression stage 808 may be coupled to first manifold system 810 which may be coupled to leading edge housing 802 and the nozzle housing included in leading edge housing 802. In this way, gases obtained from compression stages such as compression stage 806 and additional compression stage 808 may be provided to an internal volume of leading edge housing 802. First manifold system 810 may also include various valves and/or switches, such as valve 812, which may be configured to control the flow of gases between the compression stages and leading edge housing 802. In one example, compression stage 806 may be a fourth compression stage of system 800 and additional compression stage 808 may be a tenth compression stage of system 800. While the use of multiple compression stages has been shown in FIG. 8, it will be appreciated that a single dedicated port at one compression stage may be used. For example, compression stage 806 may be the seventh compression stage of system 800, and additional compression stage 808 might not be coupled to first manifold system 810 and might not be used for de-icing purposes.

System 800 may further include second manifold system 814 which may be coupled to fan 804 and may also be coupled to heat exchanger 815. In some embodiments, heat exchanger 815 may be coupled to third manifold system 818 and may be configured to provide cooled air to third manifold system 818. Third manifold system 818 may be coupled to one or more other components of an airplane that includes system 800. For example, third manifold system 818 may include first conduit 822 which may be coupled to an engine starter and second conduit 824 which may be coupled to various airframe ducts of the airplane. In this way, cooled air obtained via heat exchanger 815 may be provided to various other portions of the airplane that includes system 800.

Figure 9:
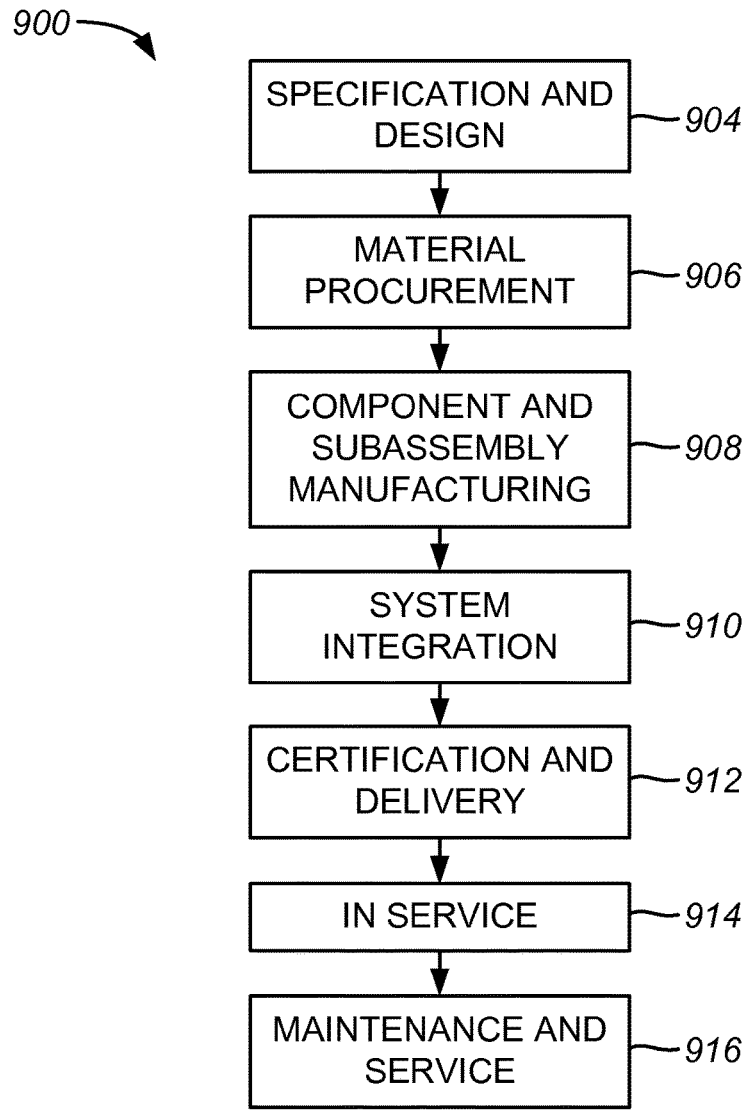
FIG. 9 illustrates a flow chart of an example of an aircraft production and service methodology, implemented in accordance with some embodiments.
Figure 10:
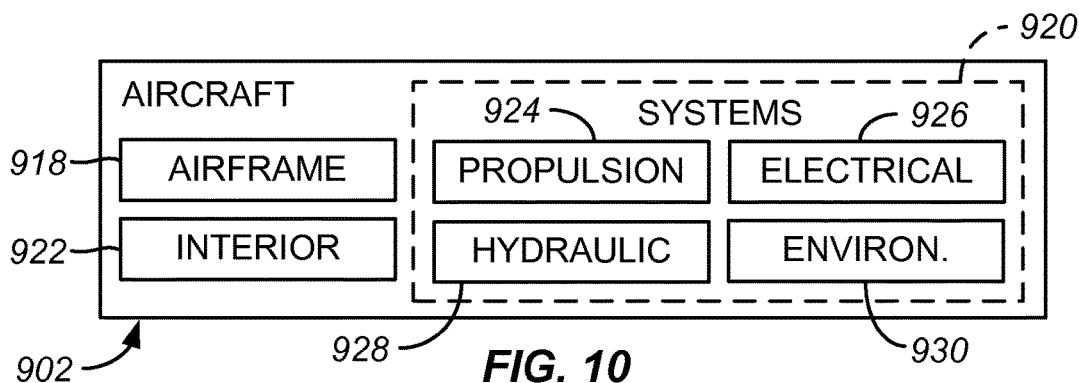
FIG. 10 illustrates a block diagram of an example of an aircraft, implemented in accordance with some embodiments.

Embodiments of the disclosure may be described in the context of an aircraft manufacturing and service method 900 as shown in FIG. 9 and an aircraft 902 as shown in FIG. 10. During pre-production, illustrative method 900 may include specification and design 904 of the aircraft 902 and material procurement 906. During production, component and subassembly manufacturing 908 and system integration 910 of the aircraft 902 takes place. Thereafter, the aircraft 902 may go through certification and delivery 912 in order to be placed in service 914. While in service by a customer, the aircraft 902 is scheduled for routine maintenance and service 916 (which may also include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, the aircraft 902 produced by illustrative method 900 may include an airframe 918 with a plurality of systems 920 and an interior 922. Examples of high-level systems 920 include one or more of a propulsion system 924, an electrical system 926, a hydraulic system 928, and an environmental system 930. Any number of other systems may be included. Although an aerospace example is shown, the principles described herein may be applied to other industries, such as the automotive industry.

Apparatus and methods embodied herein may be employed during any one or more of the stages of the production and service method 900. For example, components or subassemblies corresponding to production process 908 may be fabricated or manufactured in a manner similar to components or subassemblies produced while the aircraft 902 is in service. Also, one or more apparatus embodiments, method embodiments, or a combination thereof may be utilized during the production stages 908 and 910, for example, by substantially expediting assembly of or reducing the cost of an aircraft 902. Similarly, one or more of apparatus embodiments, method embodiments, or a combination thereof may be utilized while the aircraft 902 is in service, for example and without limitation, to maintenance and service 916.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. An apparatus for preventing formation of ice on an engine, the apparatus comprising:
   a nozzle housing having an internal cavity defining an internal volume of the nozzle housing, wherein the nozzle housing is configured to receive gases from a compression stage of the engine, and wherein the nozzle housing is further configured to provide at least some of the gases to a leading edge housing of the engine;
   a first nozzle included in a first portion of the nozzle housing, wherein the first nozzle is configured to generate a first flow pattern, and is further configured to generate a first flow of a first portion of the gases received from the compression stage, the first flow being provided into an internal volume of the leading edge housing based on the first flow pattern; and
   a second nozzle included in a second portion of the nozzle housing, wherein the second nozzle includes a concentric nozzle having an inner flange and an outer flange, wherein the inner flange defines a through-hole that passes through the second nozzle and the nozzle housing, wherein the second nozzle is configured to generate a second flow pattern based on a second portion of the gases received from the compression stage, wherein the second nozzle is configured to generate a second flow of the second portion of the gases into the internal volume of the leading edge housing based on the second flow pattern, the second flow passing between the inner flange and the outer flange.

2. The apparatus of claim 1, wherein a ratio of a first area of the first nozzle to a second area of the second nozzle is between 50:50 and 60:40.

3. The apparatus of claim 1, wherein the first nozzle has a positional offset of between 0.25 inches and 0.75 inches from a centerline of the nozzle housing.

4. The apparatus of claim 1, wherein the first nozzle has an angular offset of between 15 degrees and 25 degrees away from an internal surface of the leading edge housing.

5. The apparatus of claim 1, wherein the second nozzle has a positional offset of between 0.25 inches and 0.75 inches from a centerline of the nozzle housing.

6. The apparatus of claim 1, wherein the second nozzle has an angular offset of between 15 degrees and 25 degrees away from an internal surface of the leading edge housing.

7. The apparatus of claim 1, wherein the first nozzle and the second nozzle are separated by a distance of between 1 inch and 1.5 inches along a body of the nozzle housing.

8. The apparatus of claim 1, wherein the leading edge housing comprises an annular chamber coupled to a leading edge of an engine nacelle that includes the engine, and wherein the compression stage of the engine is coupled to a high pressure manifold system that is coupled to the nozzle housing.

9. The apparatus of claim 8, wherein the first nozzle and the second nozzle are configured to entrain a volume of gas included in the internal volume of the leading edge housing and cause a substantially uniform distribution of thermal energy within the internal volume of the leading edge housing.

10. The apparatus of claim 1, wherein the nozzle housing, the first nozzle, and the second nozzle each comprise a material that includes a nickel alloy.

11. A method for preventing formation of ice on an engine, the method comprising:
    receiving, at a nozzle housing, gases from a compression stage of an engine;
    providing, via a first nozzle, a first portion of the gases received from the compression stage to an internal volume of a leading edge housing of the engine, wherein the first nozzle provides the first portion of the gases based on a first flow pattern; and
    providing, via a second nozzle, a second portion of the gases received from the compression stage to the internal volume of the leading edge housing of the engine, wherein the second nozzle provides the second portion of the gases based on a second flow pattern, wherein the second flow pattern is determined based, at least in part, on a concentric geometry of the second nozzle that has an inner flange and an outer flange, wherein the inner flange defines a through-hole that passes through the second nozzle and the nozzle housing, and wherein the second portion of the gases passes between the inner flange and the outer flange.

12. The method of claim 11, wherein a ratio of a first area of the first nozzle to a second area of the second nozzle is between 50:50 and 60:40.

13. The method of claim 11, wherein the first nozzle and the second nozzle each have a positional offset of between 0.25 inches and 0.75 inches and each have an angular offset of between 15 degrees and 25 degrees.

14. The method of claim 11 further comprising:
    entraining a volume of gas included in the internal volume of the leading edge housing; and
    distributing thermal energy within the internal volume of the leading edge housing such that the distribution of the thermal energy within the internal volume is substantially uniform.

15. The method of claim 14, wherein an average temperature of the leading edge housing is between 290 degrees Fahrenheit and 420 degrees Fahrenheit.

16. A system for preventing formation of ice on an engine, the system comprising:
    an engine nacelle including a plurality of compression stages configured to pressurize gases;
    a leading edge housing coupled to a leading edge of the engine nacelle, wherein the leading edge housing comprises an annular chamber defining a first internal volume; a manifold system configured to receive gases from at least one of the plurality of compression stages of the engine nacelle;
    a nozzle housing mounted within the leading edge housing, wherein the nozzle housing includes an internal cavity defining a second internal volume, and wherein the nozzle housing is coupled to the manifold system and is configured to receive gases from the manifold system;
    a first nozzle included in a first portion of the nozzle housing, wherein the first nozzle is configured to generate a first flow pattern, and is further configured to generate a first flow of a first portion of the gases received from at least one compression stage, the first flow being provided into the first internal volume of the leading edge housing based on the first flow pattern; and
    a second nozzle included in a second portion of the nozzle housing, wherein the second nozzle includes a concentric nozzle having an inner flange and an outer flange, wherein the inner flange defines a through-hole that passes through the second nozzle and the nozzle housing, wherein the second nozzle is configured to generate a second flow pattern based on a second portion of the gases received from the at least one compression stage, wherein the second nozzle is configured to generate a second flow of the second portion of the gases into the first internal volume of the leading edge housing based on the second flow pattern, the second flow passing between the inner flange and the outer flange.

17. The system of claim 16, wherein a ratio of a first area of the first nozzle to a second area of the second nozzle is between 50:50 and 60:40.

18. The system of claim 16, wherein the first nozzle and the second nozzle each have a positional offset of between 0.25 inches and 0.75 inches, and wherein the first nozzle and the second nozzle each have an angular offset of between 15 degrees and 25 degrees.

19. The system of claim 16, wherein an opening of the second nozzle has an outer diameter of between 0.76 inches and 1 inch, and wherein the opening has an inner diameter of between 0.5 inches and 0.75 inches.

20. The system of claim 16, wherein the first nozzle and the second nozzle are configured to entrain a volume of gas included in the first internal volume of the leading edge housing and to cause a substantially uniform distribution of thermal energy within the first internal volume of the leading edge housing.

* * * * *